May 7, 1963 A. C. REYNOLDS, JR 3,089,125

AUTOMATIC STORAGE ADDRESSING APPARATUS

Filed Jan. 11, 1957

2 Sheets-Sheet 1

INVENTOR.
ANDREW C. REYNOLDS JR.
BY John P. Sarity
ATTORNEY

United States Patent Office 3,089,125

Patented May 7, 1963

3,089,125
AUTOMATIC STORAGE ADDRESSING APPARATUS

Andrew C. Reynolds, Jr., Waterbury, Conn., assignor to International Business Machines Corporation, New York, N.Y., a corporation of New York Filed Jan. 11, 1957, Ser. No. 633,700
4 Claims. (Cl. 340—172.5)

This invention relates to the automatic addressing of random access storage units.

An object of this invention is to provide improved means for automatically locating the address of some given information stored in a random access memory unit.

A random access memory or storage unit is a device which stores information in such a way that any unit of the information is directly accessible. That is, given the address of any location, the memory device is able to directly go to that location and read out the information stored there. One or more units of information are stored at a storage position. "Internal address" is defined as the name of this storage position.

If but one unit of information is stored in one storage position, then the storage of $10^n$ units of information in a random access file, requires $10^n$ storage positions and an $n$ decimal digit internal address.

Depending upon the specific application, the unit of information may refer to an insurance policy, machine part, or customer transaction, etc. The term "external address" will be used to designate the policy, part or customer number. For example, part No. 153216 is an external address and if the information referring to this part is stored in 956th storage position, it would have the internal address of 956. Thus, just as the internal address is the name of the memory location, so the external address is the name of the policy or part, etc.

The external addresses are sometimes alphanumeric. If we have an M character external address and if $i$ of the characters are numeric, and $j$ alphabetic (where $i+j=m$) then the number of possible external addresses is $M=10^i \times 26^j$.

The discussion hereafter will refer only to numeric addresses for simplicity. The alphabetic addresses may be handled in the same manner as numeric addresses, for example, by choosing a system of notation having a sufficiently large base.

Although there are M possible external addresses, it is rare if ever that each of them designates some policy or part number. The more usual case is that only N of the M possible external addresses are actually assigned. It is usually the case that the internal addresses are ordered from 1 to N, where N is the number of storage positions or units of storage. However, it is not usually the case that the external addresses are assigned in any order.

It is thus seen that the external addresses range over a much larger class of numbers than do the internal addresses for any given application. Thus, there are large unused or unassigned gaps in the sequence of external addresses. Furthermore, it often happens that some of the unassigned external addresses may be assigned to a new part, and likewise, it may happen that one or more parts become obsolete and hence their part numbers are no longer used. Additionally, the used external addresses may be numbers bunched together. It is thus seen that these gaps are fundamentally unpredictable.

The problem of automatically adressing is to find the internal address for any given assigned external address. Since there are unpredictable gaps in the sequence of external addresses, there is no direct way to know which internal address corresponds to an external address. The problem is therefore to automatically determine the correct internal address for any given external address.

It is an object of the present invention to provide improved means for automatically determining the correct internal address for any given external address.

It is uneconomical to use the external address as the internal address; that is to say, providing a storage position for the unassigned external addresses as well as those which are assigned. Specifically, therewould be as much wasted storage space as there are unassigned external addresses.

The method of scanning the entire storage in order to find the correct information is enormously time consuming, especially when the number of items of information is large. With this type of system, on the average half of the memory would be scanned for each inquiry.

It is another object of the present invention to provide improved means for addressing random access storage in a relatively short time and enabling relatively economical use of storage space.

If the external address is converted to some nonunique internal address of fewer positions, then more than one item number is stored at each internal address and the scanning of each internal address is required. If the internal address contains comparatively few members, the time required for scanning is relatively small.

In general, there is no way of predicting the distribution of items over the internal address positions, that is, predicting how many of the items will fall in any given address position. Thus, the internal address positions would need to be of a very large size or a proportionately large overflow storage would be required.

"Overflow" is defined as the exceeding of the capacity of an internal address, and overflow means are the means provided to accommodate these overflows. If the internal addresses formed by compressing the external addresses fall in unpredictable groupings, then there is no way of knowing which internal addresses will receive the majority of the items. Thus, some of the internal addresses would receive such a disproportionately large number of items that the required overflow means would have to be so extensive as to counteract any economies in storage or time. If, however, the distribution of items in the internal addresses is known, then the overflow means may be made only large enough to handle an overflow known to any desired probability.

The distribution of a series of random numbers can be predicted. Assume that the external addresses are shortened or compressed and that the shortened addresses are randomly distributed throughout the range of all possible shortened addresses, then the probability of $i$ records having the same shortened address is given by the Poisson approximation to the binominal distribution curve, $$P(u, i)=\frac{E^{-u}u^i}{i!}$$

where $u$ is the total number of entries required, divided by the number of internal addresses available, $i$ equals the number of items in a given address cell, E is the natural logarithmic base, and P($u$, $i$) equals the decimal fraction of the total number of items distributed among cells containing precisely $i$ items. Thus, $u$ can have any positive rational value, but $i$ is restricted to integral positive values including zero.

Accordingly, it is an object of the present invention to provide means for generating a series of random numbers from a series of other numbers.

Another object is to provide means for generating a smaller multidigit random number from a larger multidigit number.

Another object is to provide means for compressing external addresses into randomly distributed internal addresses.

According to the present invention, translation from an external address to an internal address is accomplished by compressing the external address into the required number of digits such that the same external address always produces the same internal address. This is done by adding digits from selected positions in the external address, discarding the carry, and forming the required number of such sums to produce an internal address of the desired length. For example, suppose that the external address consists of eight digits while the internal address requires four digits. Such an external address might be 34908562. A possible selection of positions to be added is the first and fifth, second and sixth, etc. Adding thusly and casting out 10's produces the internal address 1952.

This system of compression produces a regrouping of the records, which regrouping is according to the internal addresses. This regrouping is also in the form of a Poisson distribution. The regrouping in this form is independent of the orignal set of external addresses. Thus, a general addressing arrangement is provided that is applicable to all random access systems.

Other objects of the invention will be pointed out in the following description and claims and illustrated in the accompanying drawings, which disclose, by way of examples, the principle of the invention and the best mode, which has been contemplated, of applying that principle.

Figure 1:
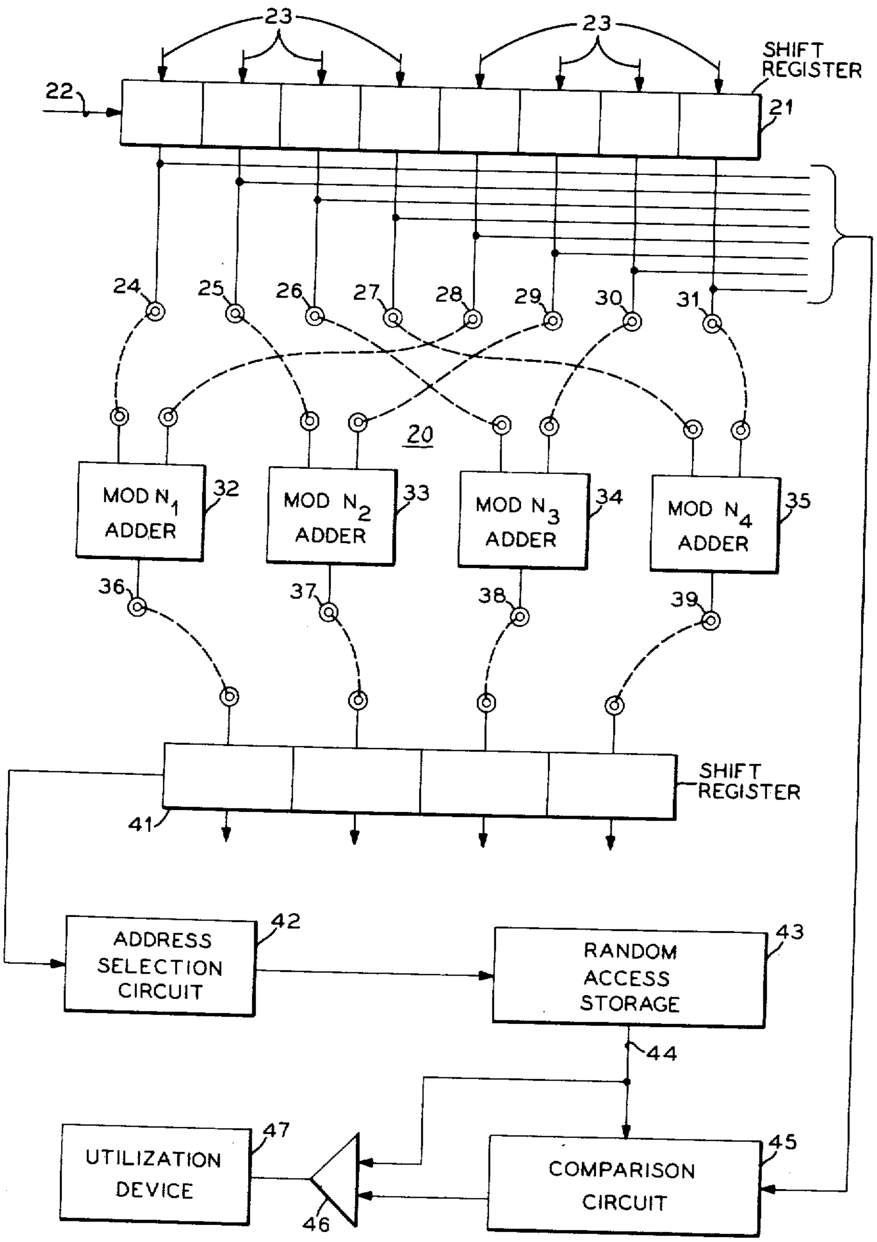
FIG. 1 is a diagrammatic block representation of a random access storage system addressed by apparatus constructed in accordance with the present invention.

Referring to FIG. 1, addressing apparatus 20 for random access storage is shown comprising a register 21 adapted to store an eight digit external address. Register 21 may be a shift register into which digits are entered serially or in parallel from any desired source over serial input 22 or parallel input 23. Such registers are well known in the art and are not shown in detail herein but may be constructed if desired in accordance with the teachings of Hamilton et al. Patent No. 2,700,502, assigned to the same assignee as the present application. This patent uses a four element code and thus requires only four binary type shift registers operating in parallel. To form a biquinary shift register, three additional binary type registers like those shown and connected together as shown are all that is required. Register 21 is adapted to store digits in the biquinary coded form, therefore each digit position requires seven bistable devices such as triggers. Accordingly, each of the eight digit outputs, 24 through 31, consists of a seven wire channel. The outputs 24 through 31 are plug wired to the inputs of adders 32 through 35. The register outputs 24 and 28 are wired to the inputs of adder 32, the outputs 25 and 29 are wired to the inputs of adder 33, etc.

Adders 32 through 35 may each be biquinary adders of the type shown in FIGS. 68*a* through 68*l* of F. E. Hamilton et al. application Serial No. 544,520, filed November 2, 1955, and assigned to the present assignee. Such an adder should be modified by disconnecting the output of the carry latch 556 of FIG. 68*e* of the above-identified application. Briefly, this adder is a diode switching and mixing circuit that receives a value on each of two seven-line inputs and merges the several lines to manifest the lowest ordered position of the sum of the two values on a seven-line output.

The four outputs of adders 32 through 35 manifest the compressed or shortened internal address.

The four outputs 36 through 39 of adders 32 through 35 are plug wired to the inputs of a register 41. Register 41 may be of the same type as register 21 but need only store four digits.

Addressing apparatus 20 is thus adapted to compress eigh digit external addresses into four digit internal addresses. The outputs 36 through 39 provide the internal address. The adders 32 through 35 are designated Mod $N_1$ through Mod $N_4$, respectively. The significance of Mod $N_2$, for example, is that the sum produced by adder 33 has the numbers $N_2$ cast out. That is, the output of adder 33 is a partial sum or the remainder of the sum of the two inputs when divided by $N_2$. For example, if $N_2$ is 10 and the two inputs are 9 and 4, the sum output is the remainder when $9+4=13$ is divided by 10, namely 3. $N_1$, $N_2$, $N_3$ and $N_4$ may be the same but they need not be. The total number of internal addresses produced by the system shown is $N_1 \cdot N_2 \cdot N_3 \cdot N_4$. With all the adders 32 through 35 Mod 10 adders, the total number of possible internal addresses produced is $10^4$.

Figure 2:
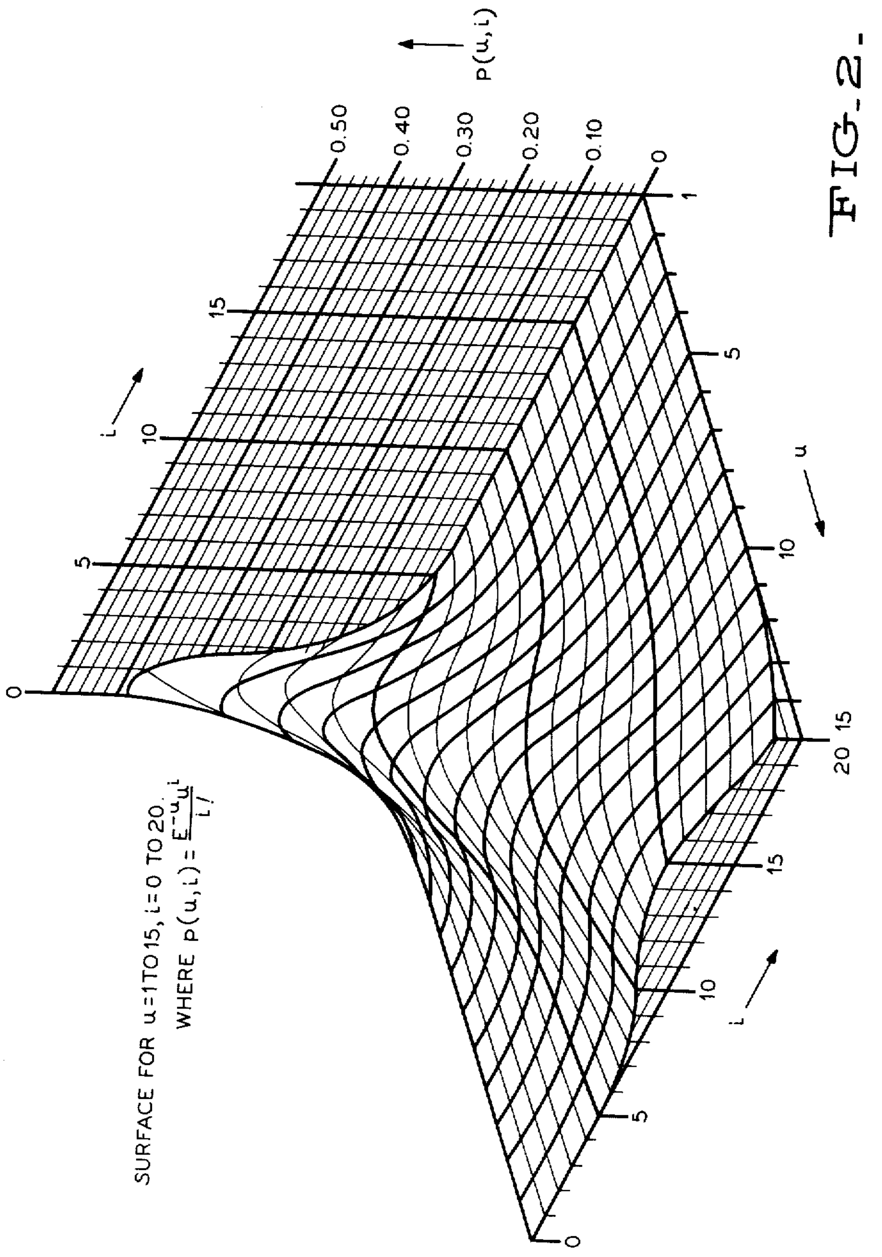
FIG. 2 is a family of curves representing the Poisson distribution.

FIG. 2 shows a family of curves representing the Poisson distribution. FIG. 2 is drawn as a family of continuous curves, but by definition has meaning only at the points defining $u$ and $i$ as given above.

It has been found that internal addresses produced as described above are randomly distributed over the entire range of internal addresses regardless of the distribution of the original external addresses. Thus, the above-described addressing apparatus produces internal addresses, the distribution of which is predictable.

A random access storage with a coacting address selection circuit is shown and described in the above-mentioned application of F. E. Hamilton et al. Briefly, this random access storage comprises a magnetic drum storage with an address register and diode switching circuits for selecting addresses on the magnetic drum. Address selection circuit 42 of FIG. 1 may be constructed as shown in the aforementioned application at FIGS. 59*a* through 59*o* and at FIGS. 71*c* and 71*f*. These circuits are referred to as static and dynamic selection circuits. In the afore-mentioned application, the address register is adapted to store information represented in the biquinary code. The address selection circuit 42 coacts with the random access storage 43 as described in the afore-mentioned application in that a number entered into the register 41 activates the corresponding address location in the random access storage to read out the values stored thereat or write new values therein.

When an address location in the random access storage 43 is activated by selection circuits 42, the contents thereof may be read out over output 44 to a comparison circuit 45. The value standing in register 21 is also fed to comparison circuit 45 to be compared with the values being read out of storage 43. Upon coincidence at comparison circuit 45, a signal is fed to switch 46 to allow the contents of this portion of the address of storage 43 to pass through switch 46 to utilization device 47. In this manner the different items at a single internal address are scanned and the one sought is fed to utilization device 47. The comparing and scanning system forms no part of the present invention and is therefore discussed only briefly.

Means for accommodating an overflow from an internal address location may be provided as desired, but are not described herein since they form no part of the present invention.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for addressing random access storage with multidigit external address numbers comprising in combination internal address means for selecting a location within said storage, a plurality of modulus adders each having first and second inputs and a single output, means for simultaneously transmitting only selected pairs of digits of said external address number to the inputs of said plurality of adders to thereby add only selected pairs of digits, and means connecting the outputs of said adders to said first named means.

2. In combination with a random access storage device having a plurality of addressable positions, apparatus for producing a random number from a multidigit number manifestation for selecting a corresponding addressable position of said storage device, comprising a source of multidigit number manifestations, means responsive to said source for adding only digits from selected positions of a multidigit number manifestation from said source to produce a plurality of partial sum manifestations such that the output of each adding means comprises one digit of the random number, and means for addressing said positions with said partial sum manifestations.

3. Apparatus for addressing a random access storage having a plurality of addressable positions comprising a source of multidigit external address numbers, a plurality of adders each having a pair of input channels and a single output channel and each adapted to produce on said output channel the partial sum of the values manifested at said pair of input channels, means for transmitting only selected pairs of digits of each multidigit external address number in parallel to said plurality of adders to thereby add only selected pairs of digits to produce an internal address number, each digit of which corresponds to an output of one of said adders, means for addressing the addressable position in said random access storage, and means connecting said output channels to said addressing means.

4. Apparatus for converting multidigit numbers into randomly distributed other multidigit numbers of fewer digits comprising: a plurality of adders each having a pair of input channels and a single output channel and each adapted to add the digits manifested at said pair of input channels and manifest the partial sum at said output channel, means manifesting the digits of a multidigit number, and means for transmitting only selected pairs of digits from said manifesting means to each of said adders to thereby produce a random multidigit number manifestation each digit of which corresponds to one of said output channels.

References Cited in the file of this patent

UNITED STATES PATENTS 2,891,238 Nettleton -------------- June 16, 1959